United States Patent
Fukuda et al.

(10) Patent No.: US 8,984,876 B2
(45) Date of Patent: Mar. 24, 2015

(54) INDUSTRIAL MACHINE

(75) Inventors: Mitsuru Fukuda, Oyama (JP); Kazuaki Kawarai, Utsunomiya (JP); Kazumi Mizukami, Moka (JP); Seiichi Otsubo, Utsunomiya (JP)

(73) Assignee: Mitutoyo Corporation, Kanagawa (JP)

( * ) Notice: Subject to any disclaimer, the term of this patent is extended or adjusted under 35 U.S.C. 154(b) by 744 days.

(21) Appl. No.: 13/223,570

(22) Filed: Sep. 1, 2011

(65) Prior Publication Data

US 2012/0067039 A1 Mar. 22, 2012

(30) Foreign Application Priority Data

Sep. 21, 2010 (JP) ................... 2010-210667

(51) Int. Cl.
*G05B 9/02* (2006.01)
*G05B 19/44* (2006.01)

(52) U.S. Cl.
CPC . *G05B 9/02* (2013.01); *G05B 19/44* (2013.01)
USPC .......................................... 60/463

(58) Field of Classification Search
CPC .......... G04C 23/40; G04C 23/38; G05B 9/02; F15B 11/064; F15B 2211/88
USPC .................. 60/459, 462, 463; 91/363 A; 137/624.11; 377/16
See application file for complete search history.

(56) References Cited

U.S. PATENT DOCUMENTS

| 3,943,972 A | * | 3/1976 | Bitonti et al. .................. 91/448 |
| 4,156,432 A | * | 5/1979 | Helwig, Jr. ............... 137/624.11 |
| 5,347,723 A | | 9/1994 | Russell |

FOREIGN PATENT DOCUMENTS

JP 2003-148581 5/2003

OTHER PUBLICATIONS

Chinese Office Action from The State Intellectual Property Office of P.R. China in Chinese Patent Application No. 201110283461.0, dated Oct. 10, 2014, together with an English language translation thereof.

* cited by examiner

*Primary Examiner* — Thomas E Lazo
(74) *Attorney, Agent, or Firm* — Greenblum & Bernstein, P.L.C.

(57) ABSTRACT

A three-dimensional measuring machine (industrial machine) includes an air supplier supplying air; a drive mechanism driven by the air supplied from the air supplier; an electromagnetic valve provided inside an air regulator set to open and close an air supply passage inside the air regulator set, the air regulator set introducing the air from the air supplier to the drive mechanism; and a motion controller controlling the electromagnetic valve to block the air supply passage when a time since the drive mechanism stopped operation reaches a preset time.

11 Claims, 4 Drawing Sheets

INDUSTRIAL MACHINE

CROSS-REFERENCE TO RELATED APPLICATIONS

The present application claims priority under 35 U.S.C. §119 of Japanese Application No. 2010-210667, filed on Sep. 21, 2010, the disclosure of which is expressly incorporated by reference herein in its entirety.

BACKGROUND OF THE INVENTION

1. Field of the Invention

The present invention relates to an industrial machine having a drive mechanism driven by air.

2. Description of Related Art

Conventionally, an industrial machine such as a three-dimensional measuring machine and the like is known in which a movement mechanism is driven using air pressure of air supplied from an air supplier (for example, see Japanese Patent Laid-Open Publication No. 2003-148581). In a three-dimensional measuring machine disclosed in Japanese Patent Laid-Open Publication No. 2003-148581, a movement mechanism is moved by a drive force supplied from a drive source. In this case, driving resistance is reduced by pumping air from an air supplier to air bearings. In such a measuring machine, after a probe is moved to a desired location, it enters a standby state. In the standby state, air from the air supplier is constantly released to the movement mechanism so as to allow the three-dimensional measuring machine to quickly react to drive the movement mechanism when the three-dimensional measuring machine is operated by a user.

However, an operation rate of an industrial machine such as the above described measuring machine and the like varies depending on users. For example, there is a case where a machine is continuously operated and used for 24 hours. However, for example, there is also a case where a machine is operated for use for only a short period of time of about 2-5 hours per day. Usually, in a factory and the like, between start and finish times of a business day, it is often that an industrial machine is maintained in a power ON state. In this case, it is often that an industrial machine is set to a standby state when it is not in use. However, in a conventional industrial machine as disclosed in the Related Art 1, even in this standby state, air is continuously released from an air supplier. For example, when an amount of air released from an air supplier is 20 ml/min in a standby state, and it is set to be in the standby state for 6 hours per day, 7200 l/day of air is wastefully released.

SUMMARY OF THE INVENTION

In view of the above described problems, a purpose of the present invention is to provide an industrial machine capable of saving energy by reducing an amount of air released.

An industrial machine of the present invention includes an air supplier supplying air; a drive mechanism driven by the air supplied from the air supplier; an electromagnetic valve provided inside an air supply passage to open and close the air supply passage, the air supply passage introducing the air from the air supplier to the drive mechanism; and a controller controlling the electromagnetic valve to block the air supply passage when a time since the drive mechanism stopped operation reaches a preset time.

In the present invention, the controller measures a time since the drive mechanism became stationary, and, when the time reaches a preset time, closes the electromagnetic valve to stop release of air from the air supplier to the movement mechanism. Therefore, when the industrial machine is in a standby state, wasteful release of air is avoided, thereby promoting energy saving.

In the industrial machine of the present invention, it is desirable that, when an operation directive signal to operate the drive mechanism is input, the controller controls the electromagnetic valve to open the air supply passage.

In the present invention, when an operation directive signal is input in a state in which release of air is stopped by the electromagnetic valve, the controller opens the electromagnetic valve to resume supply of air from the air supplier to the drive mechanism. This allows the industrial machine to quickly return from a standby state to a state in which the drive mechanism is operable, without having to initialize, for example, the air supplier and the industrial machine.

Even when an industrial machine is in a standby state, the present invention allows avoiding wasteful release of air, thereby promoting energy saving.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
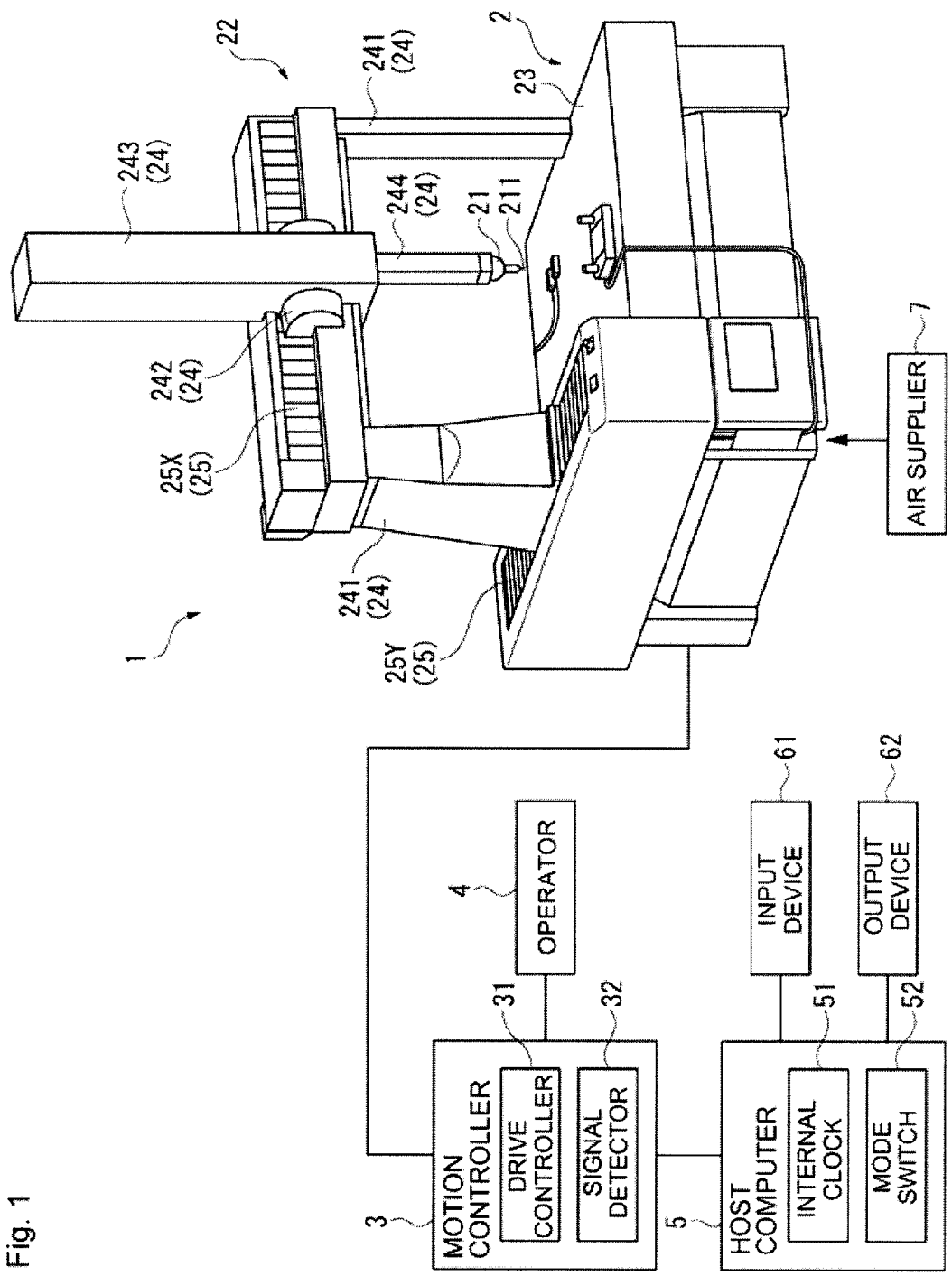
FIG. 1 is diagram illustrating a schematic configuration of a three-dimensional measuring machine (industrial machine) according to an embodiment of the present invention.
Figure 2:
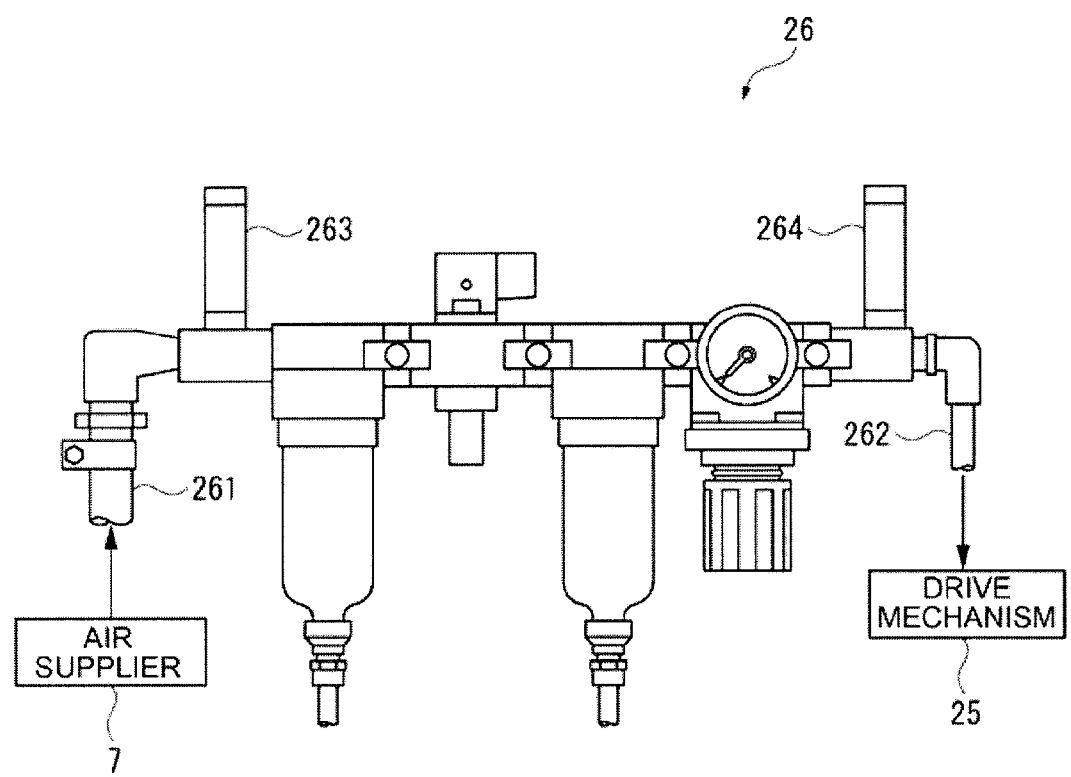
FIG. 2 is a diagram illustrating an air regulator set provided in a three-dimensional measuring machine body.

In the following, an embodiment of the present invention is explained based on the drawings. FIG. 1 is diagram illustrating a schematic configuration of a three-dimensional measuring machine, which is an industrial machine according to the embodiment of the present invention. FIG. 2 is a diagram illustrating an air regulator set provided in a three-dimensional measuring machine body.

In FIG. 1, the three-dimensional measuring machine 1 (industrial machine) includes a three-dimensional measuring machine body 2; a motion controller 3 performing drive control of the three-dimensional measuring machine body 2; an operator 4 for giving a directive to the motion controller 3 via a operation lever and the like to manually operate the three-dimensional measuring machine body 2; a host computer 5 giving a predetermined directive to the motion controller 3 and performing arithmetic processing such as shape analysis of a work mounted on the three-dimensional measuring machine body 2; and an input device 61 and an output device 62 connected to the host computer 5. The input device 61 inputs a measurement condition of the three-dimensional measuring machine 1 and the like to the host computer 5. The output device 62 outputs a measurement result of the three-dimensional measuring machine 1.

The three-dimensional measuring machine body 2 includes a probe 21 for measuring a work, having a gauge head 211 on its tip side (−Z axis direction side) making a contact with a surface of the work; a movement mechanism 22 holding a base end side (+Z axis direction side) of the probe 21 and moving the probe 21; and a base 23 on which the movement mechanism 22 is erected. Further, the three-dimensional measuring machine body 2 includes an air supplier 7 for supplying air to the movement mechanism 22; and an air regulator set 26 (air supply passage) as illustrated in FIG. 2 connecting the air supplier 7 to the movement mechanism 22.

The movement mechanism 22 includes a slide mechanism 24 causing slide movement of the probe 21 while holding the base end side of the probe 21; and a drive mechanism 25 moving the probe 21 by driving the slide mechanism 24.

The slide mechanism 24 includes two columns 241 extending in the +Z axis direction from two ends of the base 23 in the X axis direction and being provided slidable along a Y axis direction; a beam 242 being supported by the columns 241 and extending in the X axis direction; a slider 243 being formed in a cylindrical shape extending in the Z axis direction and being provided slidable on the beam 242 along the X axis direction; and a ram 244 being provided slidable inside the slider 243 along the Z axis direction while being inserted inside the slider 243.

The drive mechanism 25 includes a Y axis drive 25Y sliding the column 241, on the +X axis direction side among the columns 241, along the Y axis direction while supporting the column 241; an X axis drive 25X moving the slider 243 along the X axis direction by sliding the slider 243 on the beam 242; and a Z axis drive (not shown in FIG. 1) moving the ram 244 along the Z axis by sliding the ram 244 inside slider 243. These drive mechanisms 25 each include a drive motor (drive source) (not shown in the drawings) and a drive transmission mechanism (not shown in the drawings) transmitting a drive force supplied from the drive motor to the slide mechanism 24, and slide the columns 241, the slider 243, and ram 244 using the drive force of the drive motor. Further, the drive mechanisms 25 each include air bearings (not shown in the drawings), into which air supplied from the air regulator set 26 can be introduced. These air bearings have a function of reducing drive resistance when the slide mechanism 24 is slid by the drive force of the drive motor.

As FIG. 2 illustrates, the air regulator set 26 includes an air inlet 261 connected to the air supplier 7 and an air outlet 262 connected to the air bearings of the drive mechanisms 25. Further, an electromagnetic valve 263 switching between an open state and a close state of the air supply passage is provided between the air inlet 261 and the air outlet 262 of the air regulator set 26. The electromagnetic valve 263, having its operation controlled by the motion controller 3, switches between an air stop state in which the air supply passage is blocked to stop releasing of air from the air outlet 262 to the drive mechanism 25, and an air supply state in which the air supply passage is opened to release air introduced from the air inlet 261 from the air outlet 262 to the drive mechanism 25.

Further, a pressure switch 264 is provided between the electromagnetic valve 263 and the air outlet 262 of the air regulator set 26. The pressure switch 264 detects an air pressure at the air outlet 262 and outputs a pressure detection signal corresponding to the air pressure.

As a controller, the motion controller 3 includes a drive controller 31 controlling the drive mechanism 25, and a signal detector 32 detecting a signal output from a sensor (not shown in the drawings) provided in the drive mechanism 25. The drive controller 31 controls the operation of the drive mechanism 25 based on an operation directive signal input when the operator 4 is operated and an operation directive signal input from the host computer 5. Further, when the operator 4 is operated, the drive controller 31 outputs the operation signal to the host computer 5. Further, based on a standby directive signal or an operation directive signal input from the host computer 5, the drive controller 31 controls the operation of the electromagnetic valve to switch between the air stop state and the air supply state.

The signal detector 32 detects a signal output from each sensor to detect an amount of displacement of the slide mechanism 24, and outputs the amount to the host computer 5. Further, the signal detector 32 detects a pressure detection signal output from the pressure switch 264, and outputs the signal to the host computer 5.

The host computer 5 is configured to include a CPU (Central Processing Unit), a memory, and the like, and, by giving a predetermined directive to the motion controller 3, controls the three-dimensional measuring machine body 2 to move the gauge head 211 using the movement mechanism 22 along a surface of a work to measure a shape of the work.

Further, as FIG. 1 illustrates, the host computer 5 includes an internal clock 51, and a mode switch 52 switching a state of the three-dimensional measuring machine 1 from an operation state to a standby state according to a time measured by the internal clock 51. The mode switch 52 monitors a time measured by the internal clock 51, and obtains an elapsed time since an operation directive signal is output from the motion controller 3 to the drive mechanism 25, that is, an elapsed time since the drive mechanism 25 is last operated. When the elapsed time reaches a preset time, the mode switch 52 switches the mode state of the three-dimensional measuring machine 1 to a standby state, and outputs a standby directive signal to the motion controller 3. By doing so, as described above, the motion controller 3 controls the electromagnetic valve 263 to block the air supply passage and switches to an air stop state. That is, according to an elapsed time since the drive mechanism 25 is stopped, when the elapsed time reaches a set time, the motion controller 3 controls the electromagnetic valve 263 to block the air.

Further, for example, when a signal to operate the drive mechanism 25 (operation directive signal) is input, such as in a case where the operator 4 is operated and this operation signal is input from the motion controller 3, and where an input signal to operate the drive mechanism 25 is input from the input device 61, the mode switch 52 switches from the standby state to the operation state, and outputs this operation directive signal to the motion controller 3. By doing so, as described above, the motion controller 3 controls the electromagnetic valve 263 to open the air supply passage and switches to an air supply state.

At this time, as described above, the signal detector 32 of the motion controller 3 detects a pressure detection signal output from the pressure switch 264, and monitors an air pressure at the air outlet 262. Then, when the air pressure reaches a preset pressure, the drive mechanism 25 is operated according to a directive command of an operation directive signal.

Usually, in the three-dimensional measuring machine body 2, the air pressure detected by the pressure switch 264 is monitored, and when the air pressure became equal to or less than a preset pressure, an error occurs. The error is output from the motion controller 3 to the host computer 5. Therefore, an error message also pups up on the output device 62 (for example, a display). Here, as the resume operation, when the three-dimensional measuring machine 1 is brought from the standby state back to the operation state, this error is reset. That is, it may be configured such that, by clearing the error message that popped up, a resume directive signal (operation directive signal) is output from the mode switch 52 to the motion controller 3.

[Mode Switch Operation of the Three-Dimensional Measuring Machine]

Next, a process performed when switching from an operation state to a standby state, and a process of a resume operation switching from a standby state to an operation state, in the three-dimensional measuring machine 1 as described above, are explained based on the drawings.

(Switching to Standby Operation)

Figure 3:
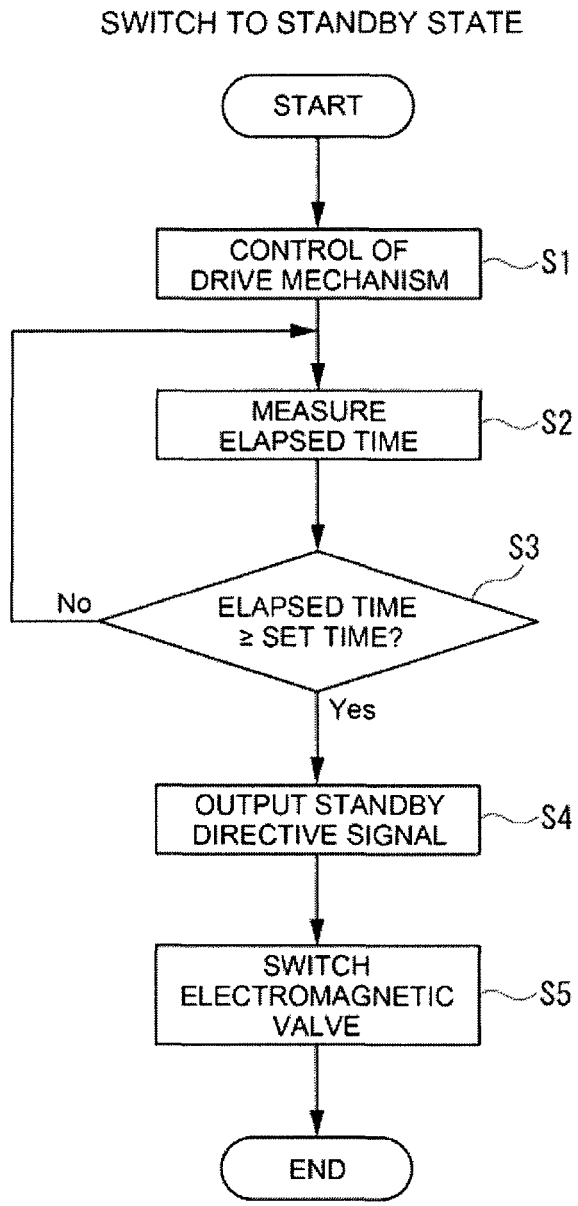
FIG. 3 is a flowchart illustrating a process of switching to a standby state of the three-dimensional measuring machine according to the present embodiment.

FIG. 3 is a flowchart illustrating a process of switching to a standby state of the three-dimensional measuring machine 1 according to the present embodiment.

As FIG. 3 illustrates, when a directive command to operate the drive mechanism 25 is input by, for example, an operation of the operator 4 or from the input device 61, an operation control signal is input from the motion controller 3 to the drive mechanism 25, and the drive mechanism 25 operates (step S1). Then, the mode switch 52 of the host computer 5 monitors a time measured by the internal clock 51, and measures an elapsed time since the drive mechanism 25 stopped (step S2).

Then, the mode switch 52 judges whether the elapsed time measured at step S2 has reached a preset time (step S3). When the elapsed time became equal to or longer than the set time, the mode switch 52 switches the mode of the three-dimensional measuring machine 1 from an operation mode to a standby mode, and outputs a standby directive signal to the motion controller 3 (step S4).

Upon receiving a standby directive signal from the host computer 5, the motion controller 3 outputs a predetermined control signal to the electromagnetic valve 263 of the air regulator set 26 of the three-dimensional measuring machine body 2 to block the air supply passage. (step S5). This results in an air stop state in which air from the air supplier 7 is not supplied to the drive mechanism 25, avoiding wasteful release of air in a standby state.

(Resume Operation from Standby State)

Figure 4:
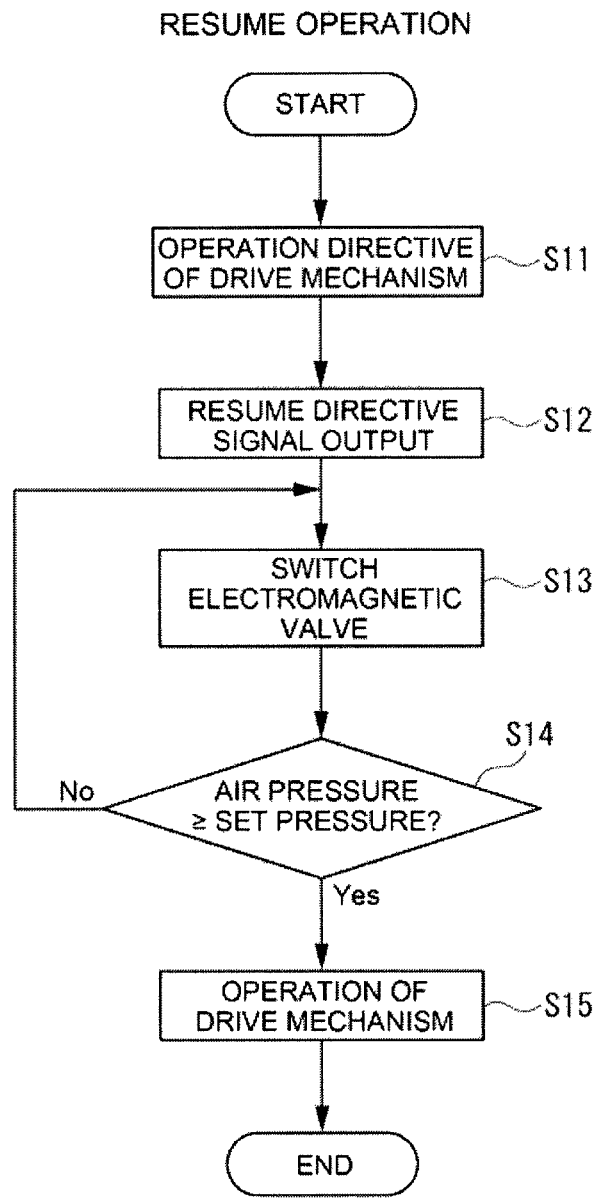
FIG. 4 is a flowchart illustrating a resume operation bringing the three-dimensional measuring machine according to the present embodiment from a standby state back to an operation state.

FIG. 4 is a flowchart illustrating a process bringing the three-dimensional measuring machine 1 according to the present embodiment from a standby state back to an operation state. As FIG. 4 illustrates, during a standby state of the three-dimensional measuring machine 1, when a directive command to operate the drive mechanism 25 is input from, for example, the input device 61 (step S11), the mode switch 52 of the host computer 5 outputs an operation directive signal to the motion controller 3 (step S12). Also, when the operator 4 is operated by a user, an operation control signal based on the operation of the operator is directly input to the motion controller 3.

This causes the motion controller 3 to output a predetermined control signal to the electromagnetic valve 263 to open the air supply passage (step S13). This results in a state in which air introduced from the air supplier 7 is released from the air outlet 262 to the drive mechanism 25 via the air supply passage, and the air pressure at the air outlet 262 increases. The air pressure at the air outlet 262 is detected by the pressure switch 264. The motion controller 3 detects the air pressure from a detection signal output from the pressure switch 264, and judges whether the detected air pressure is equal to or above a preset pressure (step S14). When it is judged that the air pressure at the air outlet 262 is above the set pressure, the motion controller 3 operates the drive mechanism 25 based on a directive command of an operation control signal (step S15).

As the resume operation, it may also be performed by performing an error reset, as described above. In this case, when the three-dimensional measuring machine 1 enters a standby state due to the above described process of the steps S1-S5, the air supply passage is blocked by the electromagnetic valve 263. Therefore, the air pressure at the air outlet 262 decreases. The motion controller 3 monitors the value of the air pressure by monitoring a detection signal output from the pressure switch, and, when the air pressure reaches a preset lower limit, outputs an error. The host computer 5 lets the error message pop up on the output device 62 (display). Then, to operate the three-dimensional measuring machine 1, a user clears the error message that has popped up. This causes the mode switch 52 of the host computer 5 to output a resume directive signal (operation directive signal) to the motion controller 3. Such a process is also possible.

[Effect of the Present Embodiment]

As described above, the three-dimensional measuring machine 1 according to the above described embodiment includes the air supplier 7 supplying air to the air bearings of the each drive mechanism 25 of the movement mechanism 22; and the electromagnetic valve 263 provided in the air regulator set 26 releasing the air from the air supplier 7 to the drive mechanism 25. The mode switch 52 of the host computer 5 monitors a time measured by the internal clock 51, and, when an elapsed time since the drive mechanism 25 stops operating reaches a preset time, outputs a standby directive signal to the motion controller 3. Upon receiving this standby directive signal, the motion controller 3 controls the electromagnetic valve 263 to block the air supply passage to stop the flow of air. Therefore, when the three-dimensional measuring machine 1 enters a standby state, air is not released from the air outlet 262 to the movement mechanism 22, thereby avoiding wasteful release of air and promoting energy saving.

In the case where a directive command to operate the drive mechanism 25 was input to the host computer 5, and the case where the operator 4 was operated and this operation signal was input from the motion controller 3 to the host computer 5, the mode switch 52 outputs an operation directive signal to the motion controller 3. Upon receiving this operation directive signal, the motion controller 3 controls the electromagnetic valve 263 to open the air supply passage to release air from the air outlet 262 to the drive mechanism 25. Therefore, when the three-dimensional measuring machine 1 is brought from a standby state back to an operation state, there is no need to initialize, for example, the three-dimensional measuring machine body 2 and the air supplier 7. Therefore, air can be quickly supplied to the drive mechanism 25.

MODIFICATION EXAMPLES

The present invention is not limited to the one embodiment described above, but also includes, within the scope in which the object of the present invention can be achieved, modifications described in the following.

For example, in the above embodiment, as an industrial machine, the three-dimensional measuring machine 1 was described as an example, in which air was introduced to the drive mechanism to allow the air bearings to function to reduce driving resistance when the gauge head 211 was slid by a drive force of a drive motor. However, the present invention is not limited to this. The present invention is also applicable to any industrial machine having a configuration in which a drive mechanism is driven by air. For example, the present invention is also applicable to a cleaning device cleaning an object by blowing away impurities attached to the object using air. Further the present configuration is described in which the drive mechanism 25 was driven by a drive force of a drive motor and air supplied from the air supplier 7. However, for example, a configuration is also possible in which the movement mechanism 22 is moved only by air pressure of air. Even in this case, in a standby state, by blocking air supply using the electromagnetic valve 263, energy saving can be achieved.

Further, as the resume operation, examples are given in which an operation directive signal is output by a directive command input to the host computer 5 or by an operation signal input by an operation of the operator 4, and in which a resume directive signal (operation directive signal) is output by performing an error reset. However, the present invention is not limited to this. For example, a configuration or the like is also possible in which a resume button is separately provided on the motion controller 3, and a resume directive signal (operation directive signal) is output by pressing the resume button. That is, as far as it is a configuration in which a directive is given with respect to the three-dimensional measuring machine 1 and an operation directive signal is output, it can be any configuration. Further, a configuration is described as an example in which an elapsed time is measured using the internal clock of the host computer 5. However, a configuration or the like is also possible in which the motion controller 3 includes a timer and measures an elapsed time since the drive mechanism 25 was last operated.

In addition, specific structures and procedures for embodying the present invention may be modified as appropriate into other structures and the like within the scope in which the object of the present invention can be achieved.

The present invention is applicable to an industrial machine having a drive mechanism driven by air.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An industrial machine, comprising:
   an air supplier configured to supply air;
   a driver configured to be driven by the air supplied from the air supplier;
   an electromagnetic valve positioned inside an air supply passage and configured to open and close the air supply passage, the air supply passage configured to introduce the air from the air supplier to the driver; and
   a controller configured to control the electromagnetic valve to block the air supply passage when a predetermined time passes after the driver stops operating,
   wherein the driver is determined to have stopped operating when the driver is in a stationary state.

2. The industrial machine according to claim 1, wherein upon input of an operation directive signal to operate the driver, the controller controls the electromagnetic valve to open the air supply passage.

3. The industrial machine according to claim 1, further comprising:
   a pressure switch positioned inside the air supply passage, the pressure switch configured to monitor an air pressure of the air supplied from the air supplier.

4. The industrial machine according to claim 3, wherein the controller is configured to detect the air pressure monitored by the pressure switch, and to operate the driver when the air pressure reaches a preset pressure.

5. The industrial machine according to claim 4, wherein the controller is configured to output an error when the air pressure monitored by the pressure switch reaches a preset lower limit.

6. The industrial machine according to claim 5, wherein the controller is configured to reset the error when the pressure reaches the preset pressure.

7. The industrial machine according to claim 3, wherein the pressure switch is provided inside the air supply passage between the electromagnetic valve and the driver.

8. The industrial machine according to claim 1, wherein the controller is configured to switch the driver between an operation state and a standby state, and
   the controller is configured to switch the driver to the standby state from the operation state by controlling the electromagnetic valve to block the air supply passage.

9. The industrial machine according to claim 8, wherein the controller is configured to switch the driver to the operation state from the standby state by controlling the electromagnetic valve to open the air supply passage and detecting an air pressure of the air supplied from the air supplier of a preset pressure.

10. The industrial machine according to claim 8, wherein the controller is configured to output an error when an air pressure of the air supplied from the air supplier reaches a preset lower limit.

11. The industrial machine according to claim 10, wherein the controller is configured to reset the error when switching the driver to the operation state from the standby state.

* * * * *